US012578575B1

(12) United States Patent
Smeeton et al.

(10) Patent No.: US 12,578,575 B1
(45) Date of Patent: Mar. 17, 2026

(54) CORRECTIVE DEVICE FOR DISPARITY CONTROL

(71) Applicant: ENVISICS LTD, Milton Keynes (GB)

(72) Inventors: Timothy Smeeton, Milton Keynes (GB); Hugo Malin-Clegg, Milton Keynes (GB); Andrew Ramsbottom, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 19/287,745

(22) Filed: Jul. 31, 2025

(30) Foreign Application Priority Data

Dec. 19, 2024 (GB) ...................................... 2418756

(51) Int. Cl.
*G02B 27/01* (2006.01)
*B60K 35/234* (2024.01)

(52) U.S. Cl.
CPC ........ *G02B 27/0103* (2013.01); *B60K 35/234* (2024.01); *B60K 2360/25* (2024.01); *B60K 2360/29* (2024.01); *B60K 2360/31* (2024.01); *B60K 2360/33* (2024.01); *G02B 2027/011* (2013.01)

(58) Field of Classification Search
None
See application file for complete search history.

(56) References Cited

U.S. PATENT DOCUMENTS

2009/0237803 A1* 9/2009 Hotta ..................... G02B 3/005
359/630
2015/0346491 A1 12/2015 Christmas 2018/0335624 A1* 11/2018 Nakayama ......... G02B 27/0025
2022/0252879 A1 8/2022 Christmas
2022/0357576 A1* 11/2022 Liu ........................... G02B 3/08
2022/0404770 A1 12/2022 Christmas
(Continued)

FOREIGN PATENT DOCUMENTS

CN 118818777 A 10/2024
EP 4557013 A1 5/2025
(Continued)

OTHER PUBLICATIONS

Search Report in UK Patent Application GB2418756.9, dated May 30, 2025.

*Primary Examiner* — Derek S. Chapel
(74) *Attorney, Agent, or Firm* — McDonnell Boehnen Hulbert & Berghoff LLP

(57) ABSTRACT

A head-up display for a vehicle includes a picture generating unit arranged to project an image onto a screen and a replicator arranged to receive the image and replicate the image. The head-up display also includes a corrective device located in the optical path of the replicated image downstream from the replicator, arranged to compensate for a complex curvature of an optical combiner downstream from the corrective device and to form a virtual image of the image that is visible from a plurality of viewing positions of a viewing window. The corrective device is arranged to introduce a first disparity offset to at least some of the plurality of virtual image points. The first disparity offset of each virtual image point is substantially constant for the plurality of viewing positions of the viewing window and is a function of the position of the virtual image point in the virtual image.

20 Claims, 11 Drawing Sheets

(56)  References Cited

U.S. PATENT DOCUMENTS

| 2023/0064690 | A1 |   | 3/2023 | Smeeton |   |
| 2023/0204953 | A1 |   | 6/2023 | Smeeton |   |
| 2025/0164784 | A1 | * | 5/2025 | Kuehl | ...................... G02B 5/32 |
| 2025/0164785 | A1 |   | 5/2025 | Lin |   |

FOREIGN PATENT DOCUMENTS

| GB |   | 2635578 | A |   | 5/2025 |   |
| WO | WO-2023007230 | A1 | * | 2/2023 | ......... G02B 27/0103 |
| WO |   | 2025104313 | A1 |   | 5/2025 |   |

* cited by examiner

510

506

508

502

500

504

540

520

526b

524b 526a    524a

522

530 y
x
z

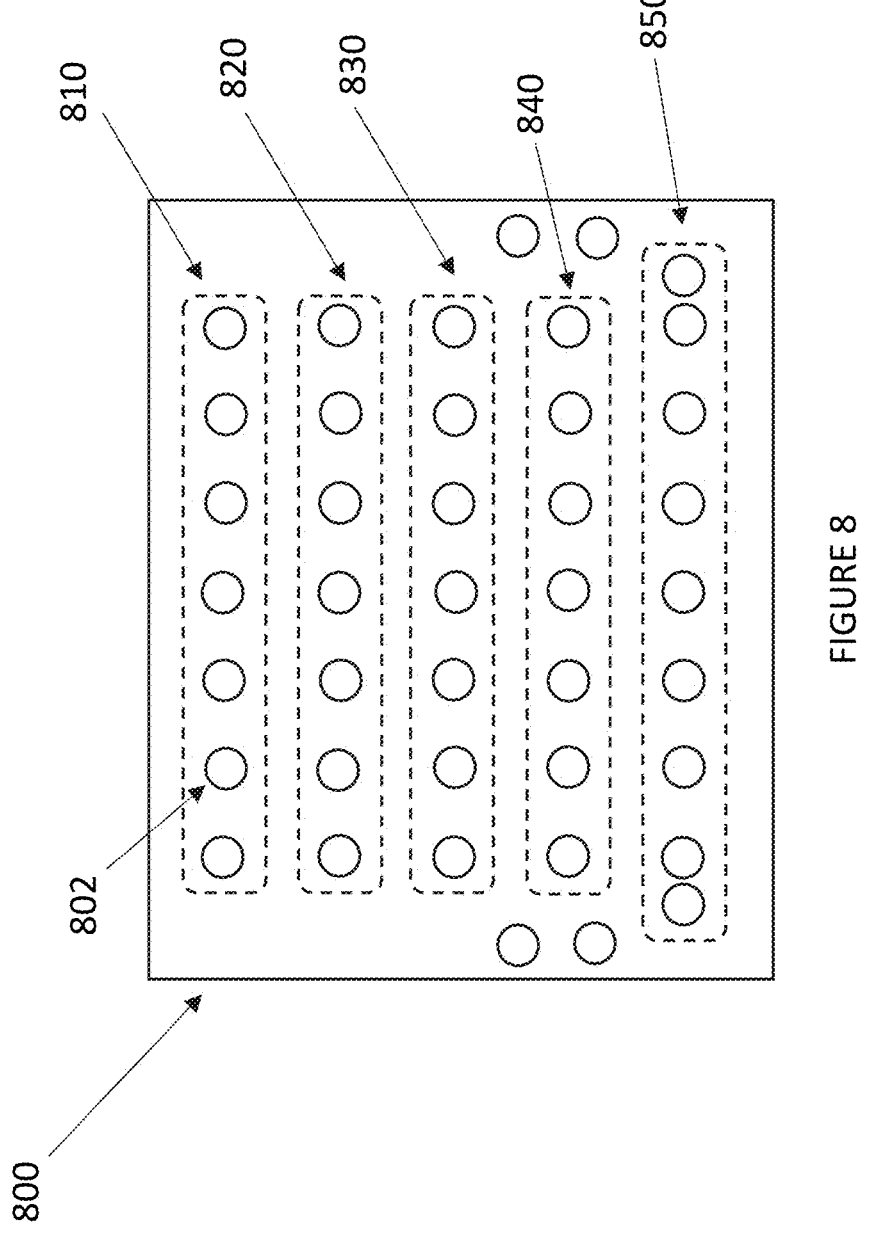
810
820
830
840
850
802
800
FIGURE 8
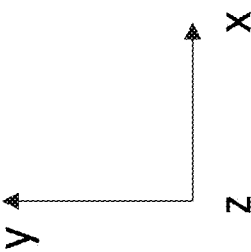

1000

1010

1020

1030

1050

1060

CORRECTIVE DEVICE FOR DISPARITY CONTROL

CROSS-REFERENCE TO RELATED APPLICATIONS

This application claims the benefit of priority of United Kingdom Patent Application no. 2418756.9, filed Dec. 19, 2024, which is hereby incorporated herein by reference in its entirety.

FIELD

The present disclosure relates to a head-up display suitable for use in a vehicle comprising a (windscreen) corrective device or layer. In some embodiments, the corrective device is principally a windscreen corrective device. The present disclosure further relates to methods of processing display light using the head-up display. More broadly, the present disclosure relates to the light control layer. Some embodiments relate to a holographic projector or picture generating unit.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In general terms, there is provided a light control device or corrective device for display light that is arranged to compensate for the curvature of an optical combiner (or, more broadly, a curved optical component) on an optical path of the display light. In embodiments, the light control device or corrective device is for display light of a display system. In embodiments, the optical combiner is on an optical path of the display system. In some embodiments, the optical combiner is a vehicle windscreen, arranged to redirect display light from a display device to a viewing window or so-called eye-box, and thereby form a virtual image. The optical combiner may have a first curvature in a first direction and a second curvature in a second direction perpendicular to the first direction. The first and/or second curvature may be non-linear. The optical combiner has a complex curvature which introduces complex distortions when used in a display system particularly one based on holographic projection.

The display light may be spatially modulated light. The display system may be arranged to relay the spatially modulated light to a viewing plane or eye-box. In embodiments, the spatially modulated light is light spatially modulated with an image or picture e.g. displayed on a screen such as a diffuser. The spatially modulated light may be referred to simply as an "image" or "picture" for convenience. The spatially modulated light may alternatively be referred to as a "picture wavefront". In a variation, the display system is a holographic display system and the spatially modulated light is light that is spatially modulated in accordance with a hologram. The spatially modulated light of this variation may be referred to as a holographic wavefront.

As above, the light control device or corrective device of the present disclosure is primarily arranged to compensate for the curvature of an optical combiner (e.g. a windscreen) on an optical path of the display system. The optical combiner being on the optical path of the display system may mean that the spatially modulated light, propagating through the display system, may be incident on, reflected by, transmitted through, or otherwise interact with the optical combiner. As the skilled person will appreciate, the curvature of the optical combiner may alter the divergence or convergence of the spatially modulated light and angles thereof. For example, if the spatially modulated light is substantially collimated upstream of the optical combiner (prior to interacting with the optical combiner), then the spatially modulated may be non-parallel (e.g. converging or diverging) downstream of the optical combiner (after interacting with the optical combiner). In other words, the optical combiner may have a lensing effect on the spatially modulated light incident thereon. If the curvature of the optical combiner is non-uniform, then the lensing effect may be non-uniform. For example, different portions of the optical combiner may have a different radius of curvature and so may have a different lensing effect on spatially modulated light incident thereon. In some embodiments, the optical combiner is a windscreen or windshield of a vehicle. A windscreen or windshield may have a complex curvature having a complex lensing effect on display light incident thereon.

A number of problems associated with the lensing effect of the optical combiner have been identified. One problem is that the lensing effect may distort the display light (of the display system). For example, the display light may be such that a picture is viewable at a viewing plane. For example, the display light may be spatially modulated in accordance with a hologram of a picture, or simply in accordance with a picture. The lensing effect of the optical combiner may distort the picture that is viewable at the viewing plane. This may adversely affect a viewing experience of the display system. Another problem identified is specific to display systems comprising a replicator, upstream of the optical combiner. The replicator may be arranged to replicate the spatially modulated light to form a plurality of replicas of the spatially modulated light. In embodiments, the replicator may be a waveguide, as described below. For example, the waveguide may comprise an input port arranged to receive the spatially modulated light. The waveguide may comprise a pair of surfaces arranged to waveguide the spatially modulated light received at the input therebetween. A first surface of the pair of surfaces may be partially-transmissive partially-reflective. The first surface may be arranged to form the plurality of replicas of the spatially modulated light. At least a portion of the first surface may be said to form an output port of the replicator/waveguide. The replicator may be arranged such that the plurality of replicas are relayed towards the optical combiner. The display system may be further arranged such that the plurality of replicas are relayed towards a viewing plane/eye-box of the display system. It has been found that the pitch of the replicas of the spatially modulated light (at the viewing plane) is important for ensuring a good viewing experience. Through simulation and experimentation, it has been further found that the pitch of the replicas may be affected by the lensing effect of the optical combiner. For example, the pitch of the replicas at the viewing plane may be increased or decreased. This may adversely affect the viewing experience. The pitch of the replicas may be reduced if the optical combiner has a concave shape, for example the inside surface of a windscreen or windshield. As used herein, the pitch of replicas refers to the separation or distance between the centres of adjacent replicas.

Light control devices/corrective devices have previously been proposed in a head-up display comprising a replicator.

Head-up displays can be single-plane or multi-plane, with the above-described head-up displays being the former. Users (i.e. viewers) perceive the displayed image(s) from a single-plane head-up display at a single distance from their point of view, whereas users perceive the displayed images from a dual-plane head-up display at two different distances from their point of view. Dual-plane head-up displays offer various benefits over their single-plane counterparts. For example, traditional vehicle instrument cluster content including speed, fuel and warning indications can be displayed directly in front of the vehicle, whilst driving hazards and directions can be overlaid in an augmented-reality style that blends in with the driving environment. Therefore, the separation in displayed image depth provided by dual-plane head-up displays enhances the user experience.

Dual-plane head-up displays according to the prior art often use a large freeform mirror to enable the presence of more than one image plane. This large freeform mirror is also used for the above-described curvature correction and to position the content at appropriate depths. The large size of this mirror is undesirable, especially in automotive applications as space in vehicle designs may already be limited between the volume assigned for the head-up display and surrounding features such as crumple zones, ventilation ducts and firewalls. The present disclosure aims to reduce the size of the head-up display without sacrificing its image quality or depth information.

The above-described head-up displays (that are single-plane head-up displays) can use the corrective devices described above instead of the freeform mirror to compensate for the complex curvature of the curved windscreen in a typical vehicle. There has been disclosed a freeform Fresnel-type corrective device that performs the optical role of the freeform mirrors but with a much smaller volume. These corrective devices cover the output surface of an optically downstream waveguide (that is, the waveguide from which replicas arrive at the optical combiner) to correct for the geometry of the optical combiner for a user's full field-of-view from everywhere in the eye-box.

However, it would be very difficult for the corrective devices as previously disclosed to be used as a starting point to create a dual-plane (or, more generally, a multi-plane) head-up display. Such a corrective device could be designed that, for a given head position of the user, images are displayed at different depths. However, when said user moves their head, the light would arrive at their eyes from a different part of the corrective device, resulting in optical anomalies such as image distortions, a change in depth perceived and/or parts of the image missing for parts of the field-of-view. As such, as the user moves their head around the eye-box, the corrective device would have to support viewing different regions of the displayed images at different depths through the same part of the corrective device. This would be further complicated by the fact that overlapping of the areas (in other words, footprints) of the corrective device corresponding to the images to be displayed at different depths prevents the desired images from forming correctly. As such, designing and manufacturing such a corrective device for use in a multi-plane head-up display may be prohibitively complex and therefore expensive.

Other methods of creating a dual-/multi-plane head-up display include more mechanical alterations to the display system, such as creating a moving corrective device with multiple areas for each display plane. These can be seen, for example, in United Kingdom patent application number GB2413433.0. However, solutions such as these often require additional components, such as mechanisms for moving the corrective device and eye-tracking devices, which increases the complexity and cost of the display system.

In a first aspect, a head-up display (in other words, a head-up display system) for a vehicle is provided. That is, the head-up display is suitable for use in a vehicle. More broadly, a display system is provided. The head-up display comprises a picture generating unit arranged to project an image onto a screen. The picture generating unit (or the "PGU") may comprise display device such as a spatial light modulator, which may be a reflective liquid crystal on silicon, "LCOS", device that is illuminated to form the image. The head-up display comprises a replicator arranged to receive the image and replicate the image. It may be said that this is to (form and) output a plurality of replicas of the image from an output surface (of the replicator). It may be said that the image is received (by the replicator) from the screen. The replication of the image may be by waveguiding between a reflective surface and a transmissive-reflective surface, the transmissive-reflective surface forming the output surface. The replicator may be a waveguide.

The head-up display further comprises a corrective device (in other words, a corrective optic or, more broadly, a light control device) located in the optical path of the replicated image (in other words, the plurality of replicas of the image) downstream from (the output surface of) the replicator. The corrective device is arranged to compensate for a complex curvature of an optical combiner (more broadly, a curved optical component) downstream from the corrective device, as described above and as is further described below. The optical combiner is further arranged to form a virtual image of the image that is visible from a plurality of viewing positions of a viewing window (in other words, an eye-box) of the head-up display. The viewing window is a virtual area in which the head-up display has been designed such within said area the image(s) displayed are visible to a sufficiently high quality and/or with a sufficiently low number of optical anomalies. It may be said that the corrective device is arranged to output the plurality of replicas of the image to the optical combiner downstream from the corrective device to form the virtual image of the image visible from a plurality of viewing positions of the viewing window. That is, the corrective device outputs replicated image (in other words, the plurality of replicas of the image) such that, through interaction with an optical combiner, a virtual image of the image to be displayed is visible to the viewer. This interaction may be through reflection, as will be discussed in greater detail below. The virtual image comprises (in other words, is formed from) a plurality of virtual image points.

The corrective device is further arranged to introduce (in other words, impart) a first disparity offset to at least some of the plurality of virtual image points. That is, the corrective device is arranged or structured in a way that causes at least some of the virtual image points to be subject to a first disparity offset. The term disparity refers to a difference (e.g. angular difference) of a virtual image point as perceived from a first viewing position (e.g. corresponding to a first detector such as a first eye) as compared to the perception from a second viewing position (e.g. corresponding to a second detector such as second eye), which the viewer can use to infer the depth of the virtual image, as will be discussed in more detail below and familiar to the person skilled in the art of optics. The present disclosure is described in terms of a pair of eyes forming a viewing system, with first and second detectors (i.e. the retinas of each eye) being at the first and second viewing positions. However, the head-up display of the present disclosure may also produce the same results to an artificial system replicating the human visual system. An object in space will naturally produce a disparity, depending on the object distance in question and other factors such as the separation between the two viewing positions i.e. between the two eyes. A "disparity offset" refers to additional disparity (i.e. an additional difference—such as an angle or angular difference—that implies a different depth) caused by the corrective device beyond that which would be otherwise apparent in the system. The first disparity offset may be called a horizontal disparity offset, as will be explained below. The first disparity offset of each virtual image point is substantially constant for (i.e. across) the plurality of viewing positions of the viewing window. That is, wherever the viewing system (i.e. the viewer) moves through the viewing window, the first disparity offset will be substantially the same for each virtual image point. In other words, the angular difference of each virtual image point is the same across the viewing window for a pair of viewing positions separated by a fixed distance (i.e. a pair of eyes separated by an interpupillary distance). "Substantially the same/substantially constant" in this instance means that the first disparity offset for each virtual image point is constant enough across all viewing positions that any image changes or distortions that would arise from a change in disparity offset are small and infrequent enough to meet the design parameters set by the designer of the specific head-up display. The first disparity offset is a function of the position of the virtual image point in the virtual image. That is, the first disparity offset differs between the different virtual image points but that, as the viewing system (i.e. the viewer) moves between viewing positions of the viewing window, the difference between the same virtual image points remains substantially constant. It may be said that this function is such that a first depth cue provided in relation to a first part of the virtual image is different to a second depth cue provided in relation to a second part of the virtual image, as will be explained in greater detail below.

In this way, the inventors have surprisingly found that the appearance of a depth or even dual- or multi-plane display can be achieved without the need for additional components or a more complex hologram compute.

Each virtual image point has a disparity. That is, light from each virtual image point reaches the left and right eye (i.e. the viewing system) at different angles (due to the distance between the eyes). This difference in angle results in the light reaching different locations on the retinas of the left and right eyes (i.e. the first and second detectors). This difference in location is the "disparity" of the image point, and is a depth cue referred to as convergence—i.e. an indicator of the depth of the image point by the brain (or the processor of a synthetic viewing system).

In accordance with this disclosure, the corrective device (which is principally included in the system to compensate for the complex curvature of the optical combiner, as discussed above) may additionally manipulate or alter the disparity of one or more of the image points. That is, the corrective device may impart a disparity offset at or to different parts of the virtual image that changes the different visual perceptions of each virtual image point. Specifically, this may alter the depth at which the virtual image point is perceived to be at (compared to neighbouring virtual image points) for different viewing positions. Prior to the invention, it was practice to minimise the disparity for single plane projection using a planar display device because it was expected that any disparity would potentially cause image distortions and discomfort for the user. It has therefore been standard practice to attempt to ensure that the absolute disparity for all virtual image points is the same for all viewing positions within the viewing window. Notably, the inventors surprisingly found that adding a ramped disparity in order to induce a soft or subtle depth cue to the virtual image was visually effective in a head-up display configuration in which the ramp broadly corresponds to a road scene e.g. the tapered appear of a road propagating off into the distance. Again, this was particularly surprising because adding a depth cue using disparity to a planar image formed by a planar display device is counterintuitive and contrary to practice in the art. In a further improvement, a depth position (in the virtual image) of a zero disparity offset baseline is aligned with an accommodation distance in order to provide an optimised viewing experience.

The inventors have surprisingly found that, instead of ensuring that the disparity for all virtual image points is the same for all viewing positions within the viewing window, a purposefully uneven disparity offset for virtual image points at the same viewing position can be advantageously used to create the effect of a dual- or multi-plane head-up display. That is, by going against the established practice and introducing a disparity offset using the corrective device, the inventors have found that parts of the image to be displayed can be effectively made to appear as if they are displayed on different planes without visual discomfort. By altering the disparity offset of neighbouring image points, a first part of the image can appear to be displayed at a different depth than a second part of the image. Thus, the effect of a dual- or multi-plane display device is achieved with the modification of the corrective device, as opposed to adding in additional components or increasing the complexity of the hologram compute.

It should be noted that not every human uses convergence as a depth cue, and many humans use other depth cues in addition to disparity. However, the inventors have surprisingly found that the display system of the first aspect can provide a depth effect (i.e. a so-called soft depth cue) to a satisfactory level to a large number of people. This is because the another of the depth cues, accommodation, reduces in effectiveness past a given distance (typically around 2 metres). As the head-up display of the present disclosure is typically associated with much longer image distances (for example, around 10 metres), convergence is often more heavily relied upon. The present disclosure is therefore highly effective for head-up display for a vehicle.

Each virtual image point may correspond to a first and second point on the screen of the head-up display. The first point may correspond to a first viewing position (in other words, a first detector position, such as first eye position) and the second point may corresponding to a second viewing position (in other words, a second detector position, such as second eye position). The corrective device may be arranged to introduce (in other words, impart) the first disparity offset by introducing (in other words, altering or changing) a separation between the first point and second point on the screen. This separation is representative of the disparity of the system, and so it may be said that the corrective device is arranged or structured in way that it changes the locations at which the first and second points are formed on the screen for each virtual image point, thereby imparting the first disparity offset. The first point may correspond to extrapolation (for example, optical ray tracing) of a first optical path from the virtual image point to the first viewing position, whilst the second point may correspond to extrapolation (for example, optical ray tracing) of a second optical path to the second viewing position. That is, the first and second points formed on the screen for each virtual image point may be found by tracing the path of replicas from said virtual image point to the first and second detectors of the viewing system respectively.

Therefore, as discussed above, the corrective device purposefully introduces a soft perception of depth into parts of the virtual image reflected by altering the points on the screen from which each virtual image point is produced. These points can be found by ray tracing the optical path of the light from the virtual image point to the viewing positions (i.e. to the eyes or detectors), and then by ray tracing the optical path of the light from the viewing positions to the screen via the optical combiner. Ray tracing can then be used to find the point of the corrective device responsible for the disparity offset of the given virtual image point from the points on the screen.

The virtual image may have a first side and a second side. The corrective device may be further arranged such that the first disparity offset of the plurality of virtual image points increases in a first direction from the first side to the second side of the virtual image. The first direction may be orthogonal to an output surface of the corrective device. That is, from the perspective of the viewer (i.e. the viewing system), the first disparity offset may increase from the top to the bottom of the virtual image. The increase in the disparity offset may be linear.

That is, the disparity offset may be such that the top part of the virtual image appears at a deeper plane (i.e. further away from the viewer/viewing system) than the bottom part of the virtual image. In this way, the top part of virtual image may be used to display features such as road directions and hazard warnings, whilst the bottom part of the virtual image may be used to display features such as vehicle information. A middle part of the virtual image may be left blank (i.e. no virtual image points are formed/displayed therein). The middle part of the virtual image may correspond to (close to) the natural accommodation distance of the viewer, and—in accordance with some embodiments—may be left empty to emphasis the difference in apparent depth between the top and bottom parts of the virtual image.

The corrective device may be further arranged to introduce (in other words, impart) a second disparity offset to at least some of the plurality of virtual image points. The second disparity offset of each virtual image point may be substantially constant for (in other words, across) the plurality of viewing positions of the viewing window. This is as per the first disparity offset as described above. The second disparity offset may be substantially constant in a second direction across the virtual image, the second direction being orthogonal to the first direction. That is, the disparity offset may be substantially constant across the virtual image in a horizontal direction (from the perspective of the viewer or viewing system). Thus, parts of the virtual image displayed on the same horizontal axis appear to be displayed at the same depth.

The virtual image may have an axis orthogonal to the first direction (i.e. parallel to the second direction). The first disparity offset of the virtual image points on (or near) the axis may correspond to the focal distance (or length) of a viewer. That is, the first disparity offset of the virtual image points on or near the axis may be substantially zero (that is, as close to zero as possible within the limits of manufacturing the corrective device and close enough to zero to provide the benefits described below). As such, the axis of the virtual image (in the horizontal direction) matches the natural focal distance of the user (that is, the distance at which it is comfortable to view the projected virtual image). The axis may be a central axis, or may be non-central, depending on where the focal distance of the head-up display is designed to be relative to the virtual image to be displayed. The focal distance of the head-up display may be tuned to correspond to the focal distance of the viewer, which increases the viewer's comfort and reduces eye strain. This tuning may be through, for example, moving the screen relative to the replicator (along the optical path of the light passing therethrough). The appearance of depth of the top and bottom of the virtual image is then provided using the convergence distance, as described above. As such, the first disparity offset may increase from a negative value at the first side of the virtual image to a positive value at the second side of the virtual image in the first direction. The first disparity offset at the second side of the virtual image may be the absolute value of the first disparity offset at the first side of the virtual image. That is, the first disparity offset ramp may be symmetrical about the (central) axis.

The corrective device may be further arranged to introduce (or impart) the first and/or second disparity offset to all of the plurality of virtual image points. That is, all virtual image points may be effected by the corrective device in this way.

The corrective device may comprises (or, in other words, may be) a so-called bulk optic. The bulk optic may have non-uniform power that compensates for the non-uniform power of the optical combiner. The non-uniform power of the bulk optic may be refractive. The head-up display may further comprise a diffractive optical element arranged to provide a global turn of the replicated image (i.e. the spatially modulated light and replicas thereof). The global turn may be diffractive. The "bulk optic" may comprise a pair of light-receiving surfaces that are both continuous in a mathematical sense—that is, can be described by a respective mathematical function that is continuous (such as one defining a plane or curved surface) rather than a repeating function or function comprising discontinuities (e.g. as per a Fresnel structure). The term "bulk optic" reflects that the component is not a film or layer but rather a physical piece of e.g. plastic or glass. This is further described in UK patent application number 2415594.7, which is hereby incorporated by reference.

The corrective device may may comprise a Fresnel structure, more specifically a Fresnel lens.

The corrective device may have a non-complex surface or plurality of surfaces, each surface arranged at an angle relative to (a plane of) an output surface (of the replicator). That is, each surface through which the replicated image passes has a least one angle relative to the replicator. Each angle may, at least in part, correspond to the first disparity offset function. That is, by changing angles of the corrective device that the replicas will pass through, the first disparity offset function may be controlled for each virtual image point. However, other methods of disparity offset modification would be known to the skilled person, depending on the type of corrective device used.

The head-up display may further comprise the optical combiner. That is, the head-up display is arranged to output the replicated image (in other words, the replicas thereof) to the viewer/viewing system via the optical combiner, but the combiner may also form part of the head-up display. The optical combiner may be a windscreen (of a vehicle). The optical combiner may form the virtual image by reflecting the replicated image (in other words, at least some of the replicas thereof) towards the viewer/viewing system. The virtual image may therefore appear beyond the optical combiner, which may be substantially transparent.

Notably, the corrective device is primarily arranged to compensate for the curvature of the optical combiner. The compensation may be a function of the position on an output surface of the replicator. That is, the compensation provided by the corrective device may vary across its surface, the compensation corresponding to the varying surface and curvature of the optical combiner. Importantly, the inventors have found that small tweaks to the corrective device can be made to induce the disparity offset ramp of the present disclosure without adversely affecting the compensation of the optical combiner. In a variation, the complex curvature compensation and the disparity offset(s) are provided by physically separate components collectively forming a "corrective device".

The screen may be a diffuser. That is, the screen may act as a numerical aperture expander to increase a numerical aperture of the image light received by the replicator. The screen may be substantially planar. That is, the screen may be sufficiently planar (flat) to minimise unwanted distortions to the image light.

The light may be spatially modulated in accordance with a picture. In a variation, the light may be spatially modulated in accordance with a hologram of a picture.

In a second aspect, a method of designing a corrective device for a head-up display is provided. The head-up display is for a vehicle (that is, suitable for use in a vehicle). The head-up display comprises a picture generating unit arranged to project an image onto a screen The head-up display further comprises a replicator arranged to receive the image and replicate the image. It may be said that the replicator outputs a plurality of replicas of the image from an output surface (of the replicator). The replicator may be a waveguide.

The display system further comprises a corrective device located in the optical path of the replicated image (in other words, the plurality of replicas of the image) downstream from (the output surface of) the replicator. The corrective device is arranged to compensate for a complex curvature of an optical combiner (more broadly, a curved optical component) downstream from the corrective device, as per the first aspect. The optical combiner is further arranged to form a virtual image of the image that is visible from a plurality of viewing positions of a viewing window (in other words, an eye-box) of the head-up display. The viewing window is a virtual area in which the head-up display has been designed such within said area the image(s) displayed are visible to a sufficiently high quality and/or with a sufficiently low number of optical anomalies. It may be said that the corrective device is arranged to output the plurality of replicas of the image to the optical combiner downstream from the corrective device to form the virtual image of the image visible from a plurality of viewing positions of the viewing window. That is, the corrective device outputs the plurality of replicas of the image such that, through interaction with an optical combiner, a virtual image of the image to be displayed is visible to the viewer. The virtual image comprises (in other words, is formed from) a plurality of virtual image points.

The method comprises optimising the corrective device to introduce (in other words, impart) a first disparity offset to at least some of the plurality of virtual image points. That is, the corrective device is optimised in a way that causes at least some of the virtual image points to be subject to a first disparity offset, as defined above in relation to the first aspect. The first disparity offset of each virtual image point is substantially constant for (in other words, across) the plurality of viewing positions of the viewing window. The first disparity offset is optimised to be a function of the position of the virtual image point in the virtual image. It may be said that the optimisation of this function is such that a first depth cue provided in relation to a first part of the virtual image is different to a second depth cue provided in relation to a second part of the virtual image, as per the first aspect.

As such, a corrective device is designed such that it can be used to replicate the appearance of a dual- or multi-plane display device, as described above.

The corrective device may have a plurality of surfaces arranged at a plurality of angles relative to an output surface of the replicator. The step of optimising the corrective device may comprise modifying the plurality of angles. As described above, this is one method of altering the disparity offset provided by the corrective device.

The optimisation may be such that the first disparity offset increases in a first direction from a first side to a second side of the virtual image. The optimisation may introduce (in other words, impart) a second disparity offset to at least some of the plurality of virtual image points. The second disparity offset of each virtual image point may be substantially constant for (i.e. across) the plurality of viewing positions of the viewing window. The second disparity offset may be substantially constant in a second direction across the virtual image, the second direction being orthogonal to the first direction.

The optimisation may be such that the first and/or second disparity offset is introduced (in other words, imparted) to all of the plurality of virtual image points.

In a third aspect, a further head-up display for a vehicle is provided that does not involve forming the image on a screen. The head-up display comprises a picture generating unit arranged to project a hologram of an image to a replicator. The picture generating unit (or the "PGU") may comprise display device such as a spatial light modulator, which may be a reflective liquid crystal on silicon, "LCOS", device that is illuminated to form the hologram of the image. The head-up display further comprises the replicator, which arranged to receive spatially modulated light and replicate the spatially modulated light. It may be said that this forms a plurality of replicas of the spatially modulated light and that the replicator outputs the replicas from an output surface. This may be by waveguiding between a reflective surface and a transmissive-reflective surface. The transmissive-reflective surface forms the output surface for the plurality of replicas of the spatially modulated light. The replicator may be a waveguide.

The head-up display further comprises a corrective device located in the optical path of the replicated spatially modulated light (i.e. the plurality of replicas of the spatially modulated light) downstream from (the output surface of) the replicator. The corrective device is arranged to compensate for a complex curvature of an optical combiner (more broadly, a curved optical component) downstream from the corrective device. The optical combiner is further arranged to form a virtual image of the image that is visible from a plurality of viewing positions of a viewing window (in other words, an eye-box) of the head-up display. The viewing window is a virtual area in which the head-up display has been designed such within said area the image(s) displayed are visible to a sufficiently high quality and/or with a sufficiently low number of optical anomalies. It may be said that the corrective device is arranged to output the replicated spatially modulated light (that is, the plurality of replicas of the spatially modulated light) to the optical combiner downstream from the corrective device to form the virtual image of the image visible from a plurality of viewing positions of the viewing window. That is, the corrective device outputs the replicated spatially modulated light (i.e. the plurality of replicas of the spatially modulated light) such that, through interaction with an optical combiner, a virtual image of the image to be displayed is visible to the viewer. The virtual image comprises (in other words, is formed from) a plurality of virtual image points.

The corrective device is further arranged to introduce (in other words, impart) a first disparity offset to at least some of the plurality of virtual image points, as in the first aspect. That is, the corrective device is arranged or structured in a way that causes at least some of the virtual image points to be subject to a first disparity offset. The first disparity offset of each virtual image point is substantially constant for (i.e. across) the plurality of viewing positions of the viewing window, as also in the first aspect. The first disparity offset is a function of the position of the virtual image point in the virtual image. That is, the first disparity offset differs between the different virtual image points but that, as the viewing system (i.e. the viewer) moves between viewing positions of the viewing window, the difference between the same virtual image points remains substantially constant.

That is, the display system of the third aspect does not comprise a screen. That is, rather than an image being formed on a screen, the replicated light is according to a hologram and the detectors (i.e. the eyes) perform the "hologram-to-eye" conversion. It may therefore be said that the spatially modulated light may be a holographic wavefront and the replicator may be arranged to form a plurality of replicas of the holographic wavefront.

Feature and advantages described in relation to the first aspect may apply to the method of the second aspect and the system of the third aspect, and vice versa.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 8 is a first schematic view of a field of view produced by a display device in accordance with the present disclosure;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used. Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
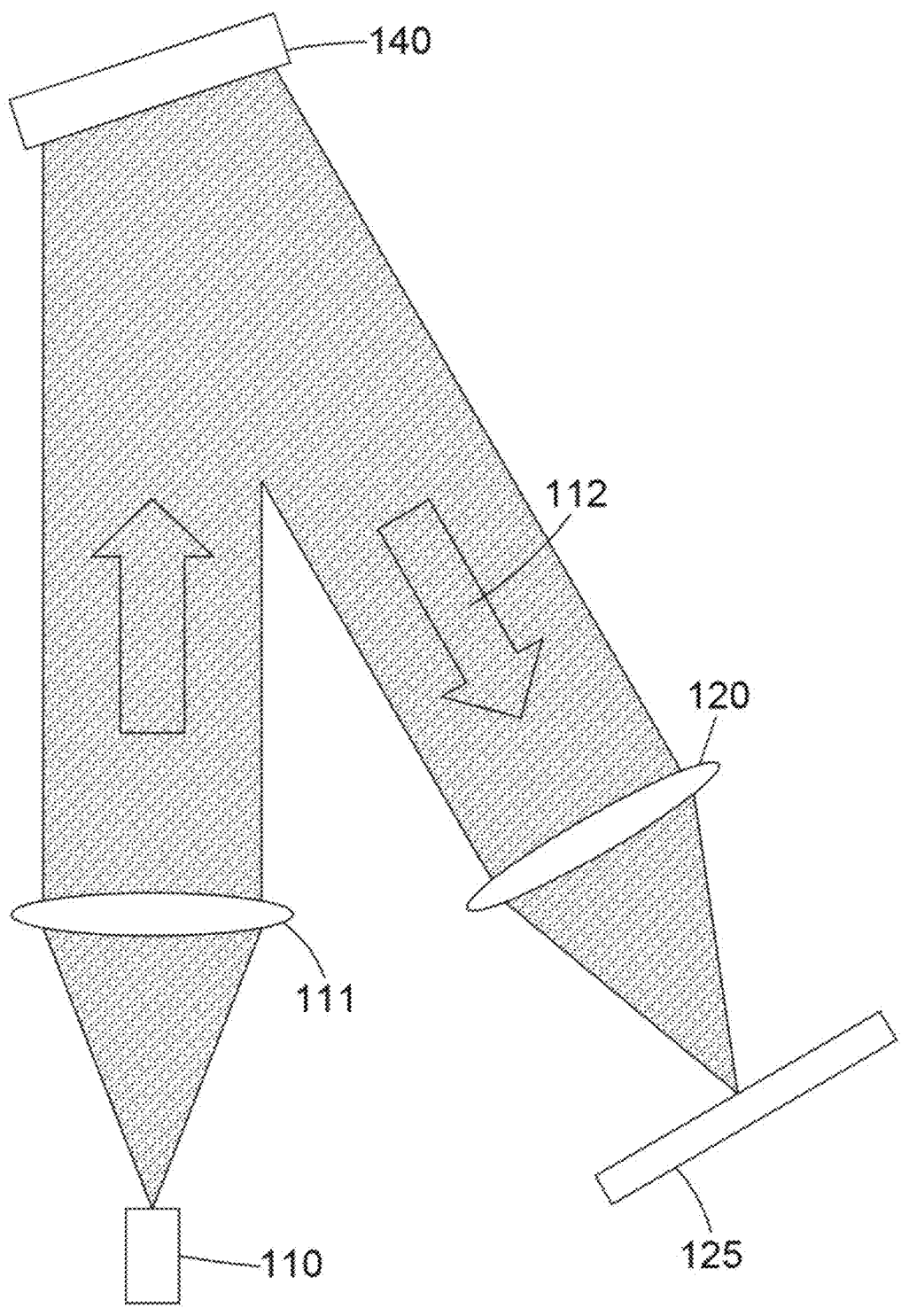
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. United Kingdom patent application publication no. 2603517, which is hereby incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. United Kingdom patent application publication no. 2610203, which is hereby incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. United Kingdom patent application publication no. 2614286, which is hereby incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/ hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channeling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
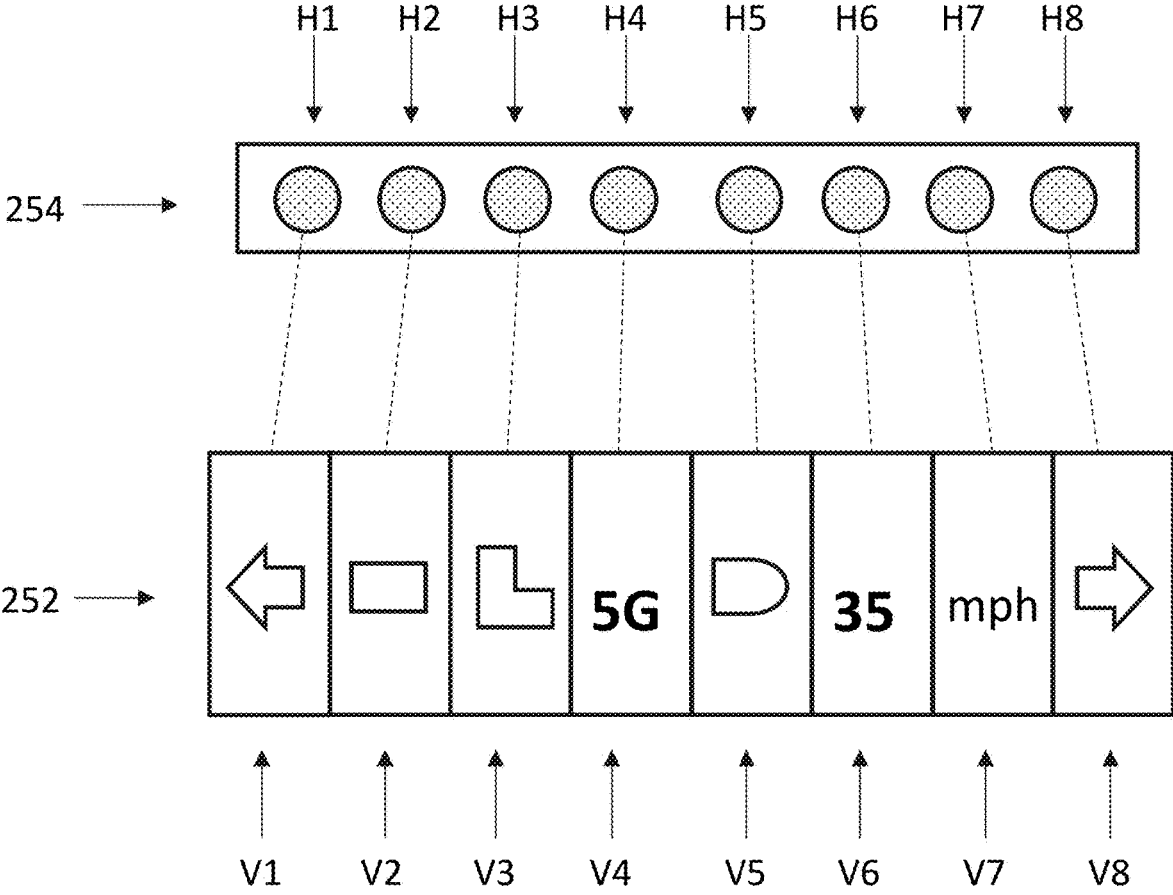
FIG. 2 shows an image for projection comprising eight image areas/components, V1 to V8, and cross-sections of the corresponding hologram channels, H1-H8.
Figure 3:
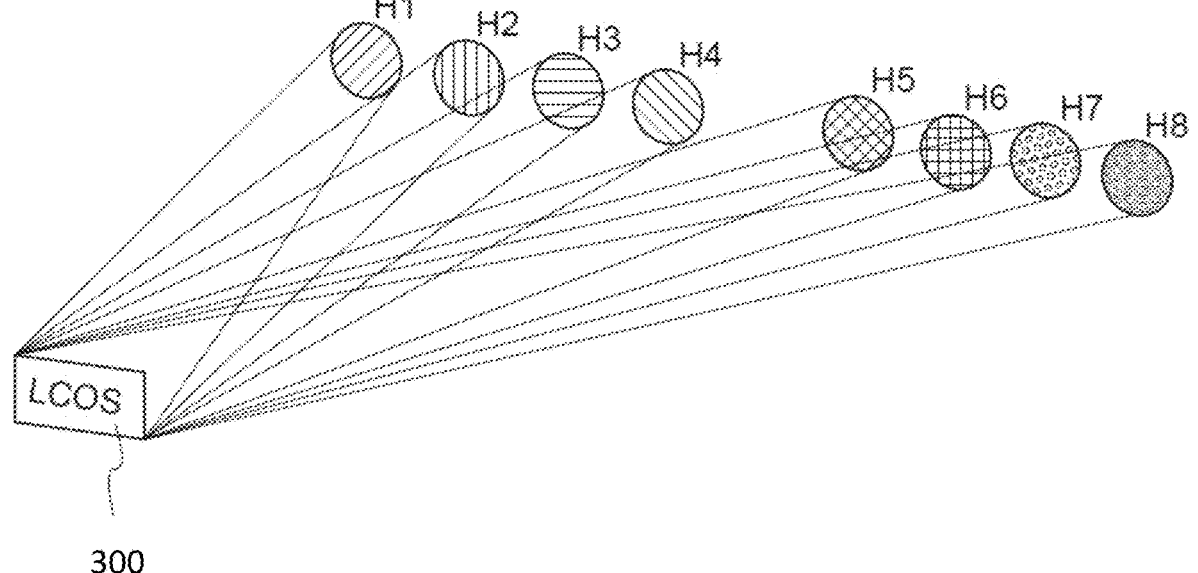
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
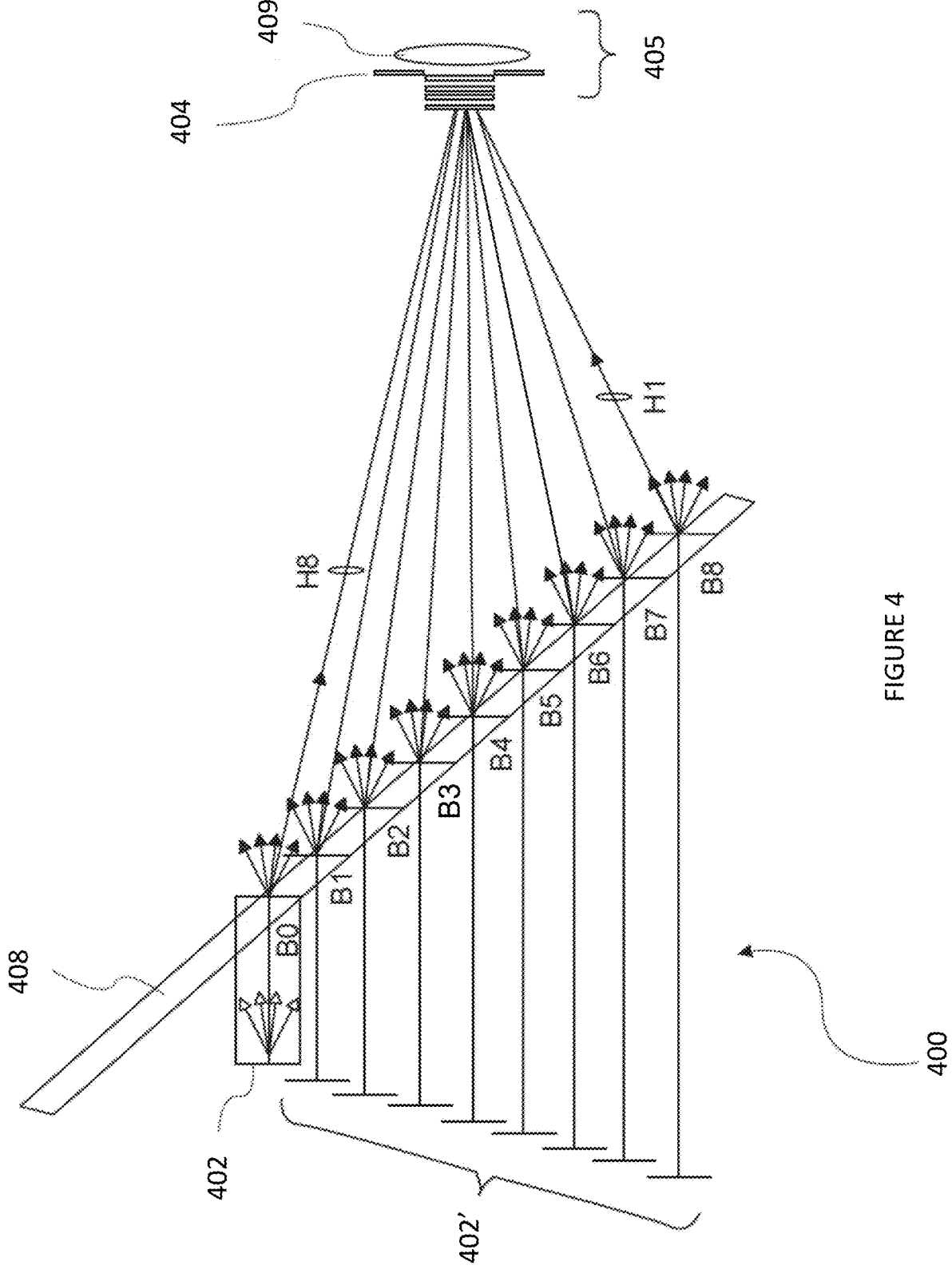
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
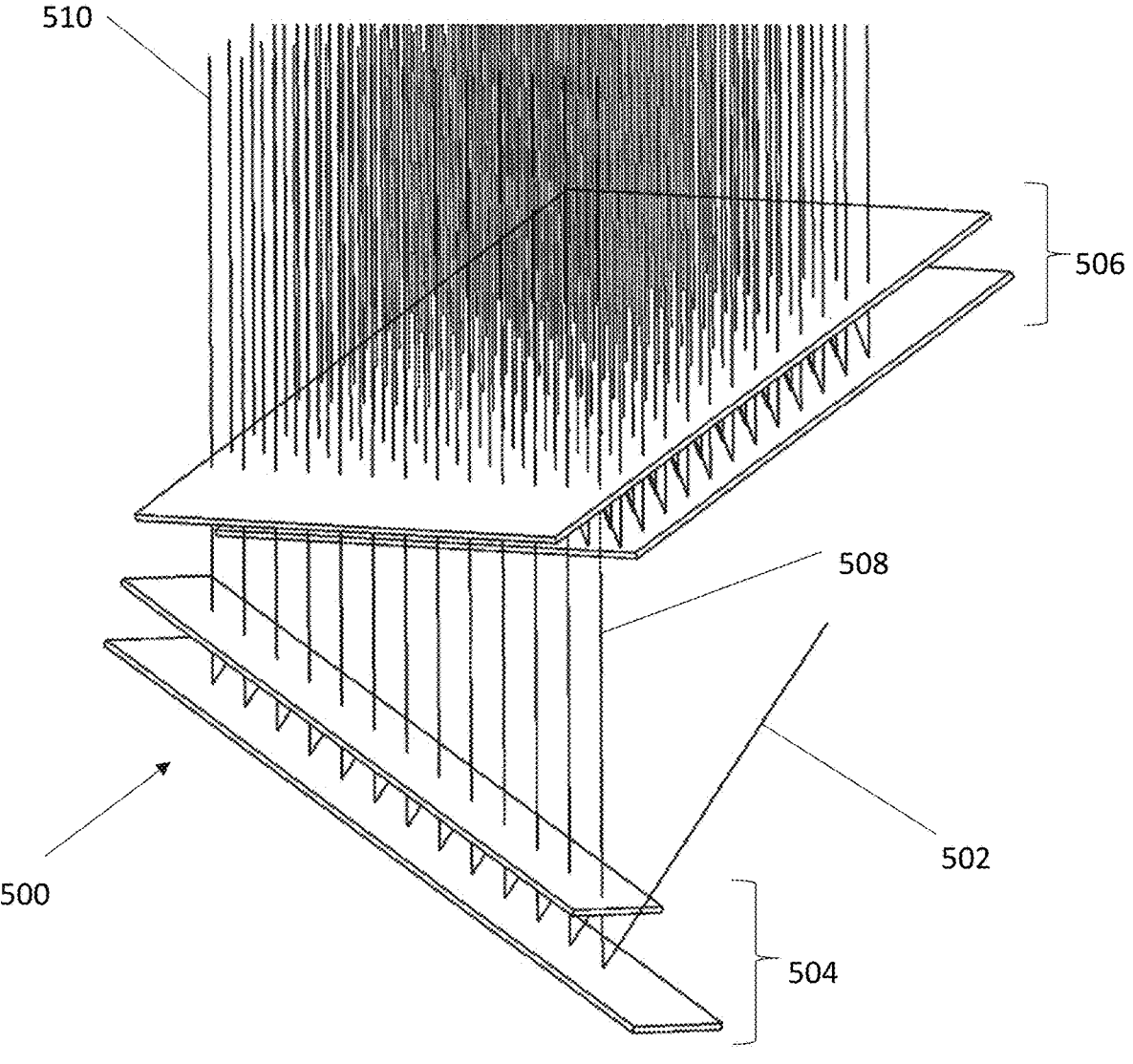
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
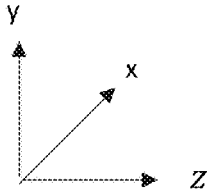
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/ plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). This addresses a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent application publication no. 2936252, which is hereby incorporated herein by reference). The present disclosure is compatible with holograms that compensate for the complex curvature of an optical combiner used as part of the projection system. In some embodiments, the optical combiner is the windscreen of a vehicle. Full details of this approach are provided in European patent application publication no. 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. United Kingdom patent application publication no. 2607899, which is hereby incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Depth Perception from Horizontal Disparity

Figure 6:
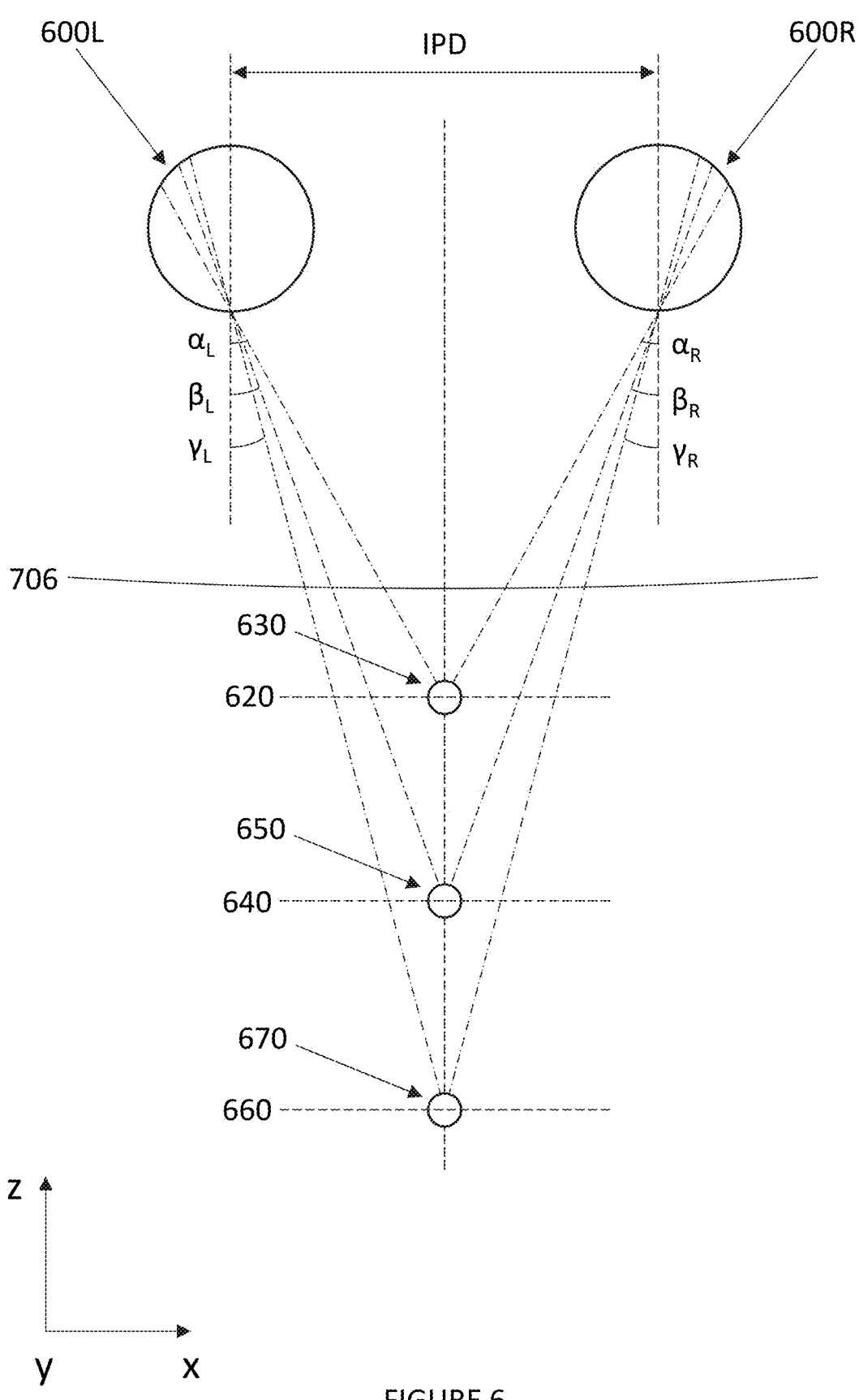
FIG. 6 is a schematic top view of the parallax effect.

Humans have multiple ways by which they can perceive the depth of an object in front of them, one of which being convergence, which utilises the parallax effect as schematically shown in FIG. 6. FIG. 6 shows a pair of eyes, a left eye 600L and a right eye 600R, each having a pupil and retina (not shown) and separated by an interpupillary distance IPD (i.e. the distance in the x-direction between the centre of the two pupils). Although the description herein refers to a human visual system, the skilled person would understand that the invention would also apply to an artificial equivalent. That is, rather than a pair of eyes each having a pupil and retina, the disclosure described herein would also function with a pair of synthetic detection systems each having an entrance aperture and detector.

When viewing (i.e. focusing on) a first object 630 on a first plane 620, light from the first object 630 passes through the pupil of the left eye 600L at a first angle $\alpha_L$ and through the pupil of the right eye 600R at a second angle $\alpha_R$. The difference, referred to as the horizontal disparity, between these first and second angles $\alpha_L$, $\alpha_R$ results in the light reaching different locations of the retinas of the first and second eyes 600L, 600R. The brain then uses these different locations of the retina to infer the depth of the first object 630 relative to the eyes 600L, 600R.

Likewise, when viewing a second object 650 on a second plane 640 (the second plane 640 being at a greater depth or further away in the z-direction from the eyes 600L, 600R than the first plane 620), light from the second object 650 passes through the pupil of the left eye 600L at a third angle $\beta_L$ and through the pupil of the right eye 600R at a fourth angle $\beta_R$. The horizontal disparity between these third and fourth angles $\beta_L$, $\beta_R$ results in the light reaching again different locations of the retinas of the first and second eyes 600L, 600R. The brain then uses these different locations of the retina to infer the depth of the second object 650 relative to the eyes 600L, 600R.

Finally, when viewing a third object 670 on a third plane 660 (the third plane 660 being at a greater depth or further away in the z-direction from the eyes 600L, 600R than both the first and second planes 620, 640), light from the third object 670 passes through the pupil of the left eye 600L at a fifth angle $\gamma_L$ and through the pupil of the right eye 600R at a sixth angle $\gamma_R$. The horizontal disparity between these fifth and sixth angles $\gamma_L$, $\gamma_R$ results in the light reaching again different locations of the retinas of the first and second eyes 600L, 600R. The brain then uses these different locations of the retina to infer the depth of the third object 670 relative to the eyes 600L, 600R.

As such, as the object 630, 650, 670 moves away from the eyes 600L, 600R (in the z-direction, i.e. has a greater depth), the horizontal disparity increases and the brain uses this to infer the depth of the object 630, 650, 670 is changing. This effect is referred to as the parallax effect, and is one of multiple depth cues used by the brain to infer the depth of an object. As a note, not everyone infers depth in this way, with some people relying purely on the other methods of depth perception.

Horizontal Disparity in a Head-Up Display

Figure 7:
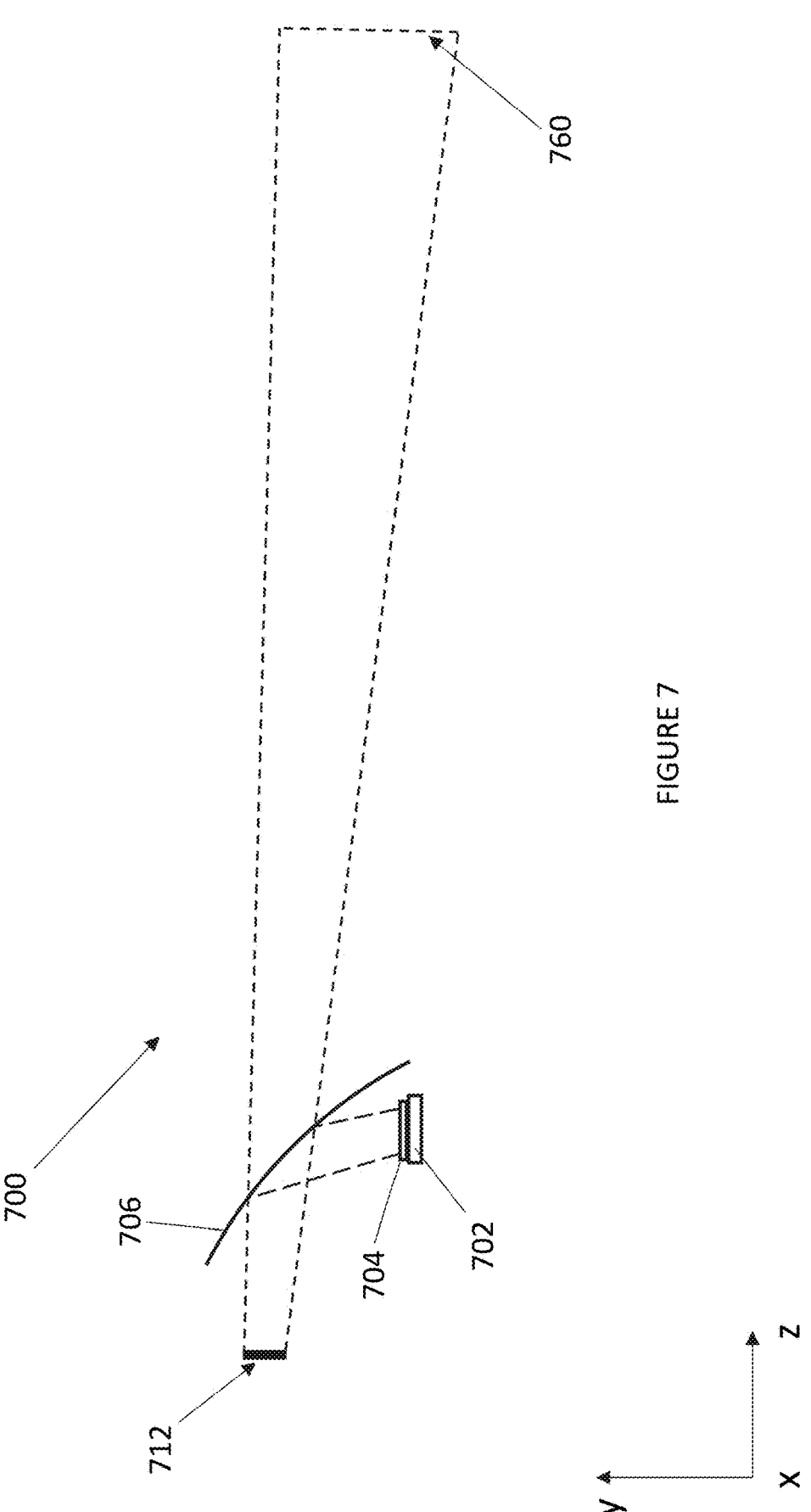
FIG. 7 is a schematic side view of a display system in accordance with the prior art.

In a head-up display system, the object 630, 650, 670 is a virtual object projected for viewing at an intended set, single plane 620, 640, 660. Such a system 700 according to the prior art is schematically shown in FIG. 7. FIG. 7 shows a (head-up) display system 700 with a waveguide 702 (or, more broadly, a replicator 702) as per the second waveguide 540 described above in relation to FIG. 5B. Waveguide 702 has an output surface from which the replicas of the image are emitted.

Positioned above the waveguide 702 (i.e. downstream of the waveguide 702 in the y-direction) is a corrective device 704 (or, more broadly, a light control device 704). The corrective device 704 compensates for the curvature of an optical combiner 706 (that is, a curved optical component), which may be a windscreen of a vehicle, and has a non-uniform optical power. For example, the corrective device 704 may comprise a layer (or a pair of layers) of prisms that effectively combine to act as a composite lens having an opposite lensing effect of the optical combiner 706 causing unwanted distortions (e.g. the windscreen or windshield). In this way, the distortion applied by the corrective device 704 can be selected to at least partially if not exactly compensate (or pre-compensate) for another source of distortion caused by the optical combiner 706 (e.g. the windscreen/windshield). In other words, the corrective device 704 does this by purposefully applying a distortion to the replicated image (in other words, the replicas thereof) that has an opposite optical power to that of the optical combiner 706, thereby removing or mitigating any distortion that would be visible to the user.

As such, the replicated image light output by the waveguide 702, pre-distorted by the corrective device 704 are, at least in part, reflected by the optical combiner 706 towards the user to form an eye-box 712 (or, more broadly, a viewing window). In this way, the user perceives a virtual image comprising a plurality of virtual image points as if it were located on a plane 760 beyond the optical combiner 712 (in the z-direction).

As can be seen in FIG. 6, due to the inter-pupil distance IPD, in order to have the image appear at the required plane 620, 640, 660, light corresponding to each virtual image point and intended to reach each eye 600L, 600R must be reflected off different parts of the optical combiner 706. If the distance between the points light intended for each eye 600L, 600R is reflected off the optical combiner 706 changes, then the virtual image point associated with said light will appear as if it is on a different plane. This may lead to the virtual image being displayed at the wrong depth, or image distortions arising from different virtual image points appearing at different depths. This distance between the points light intended for each eye 600L, 600R is reflected off the optical combiner 706 may depend on corresponding points formed on a diffuser (not shown) upstream of the waveguide 702.

As a side effect of the functions described above, the corrective device 704 may cause variation in the distance between the points light intended for each eye 600L, 600R for each virtual image point are reflected off the optical combiner 706 as compared to the distance of corresponding points on the diffuser (not shown). The changing of this distance (and thereby the changing of the disparity—the difference between the angles at which the light passes through the pupil of each eye 600L, 600R) is referred to herein as a disparity offset. That is, in achieving the complex curvature correction function as described above, the corrective device 704 may also impart a disparity offset on the virtual image points. It has therefore been the established practice to attempt to optimise the disparity offset of the corrective device 704 to be the same (or as close as possible to being the same) for all virtual image points at all positions within the eye-box 712. This reduces the number and severity of optical distortions that may occur due to the optical disparities for each image point changing as the user moves through the eye-box 712.

Improved Display Device

The inventors have surprisingly found that, contrary to the established practice of attempting to normalise the disparity offset for all virtual image points across the eye-box, intentionally including some disparity offset between at least some of the virtual image points can make parts of the virtual image appear as if it is being displayed on different planes.

Figure 9:
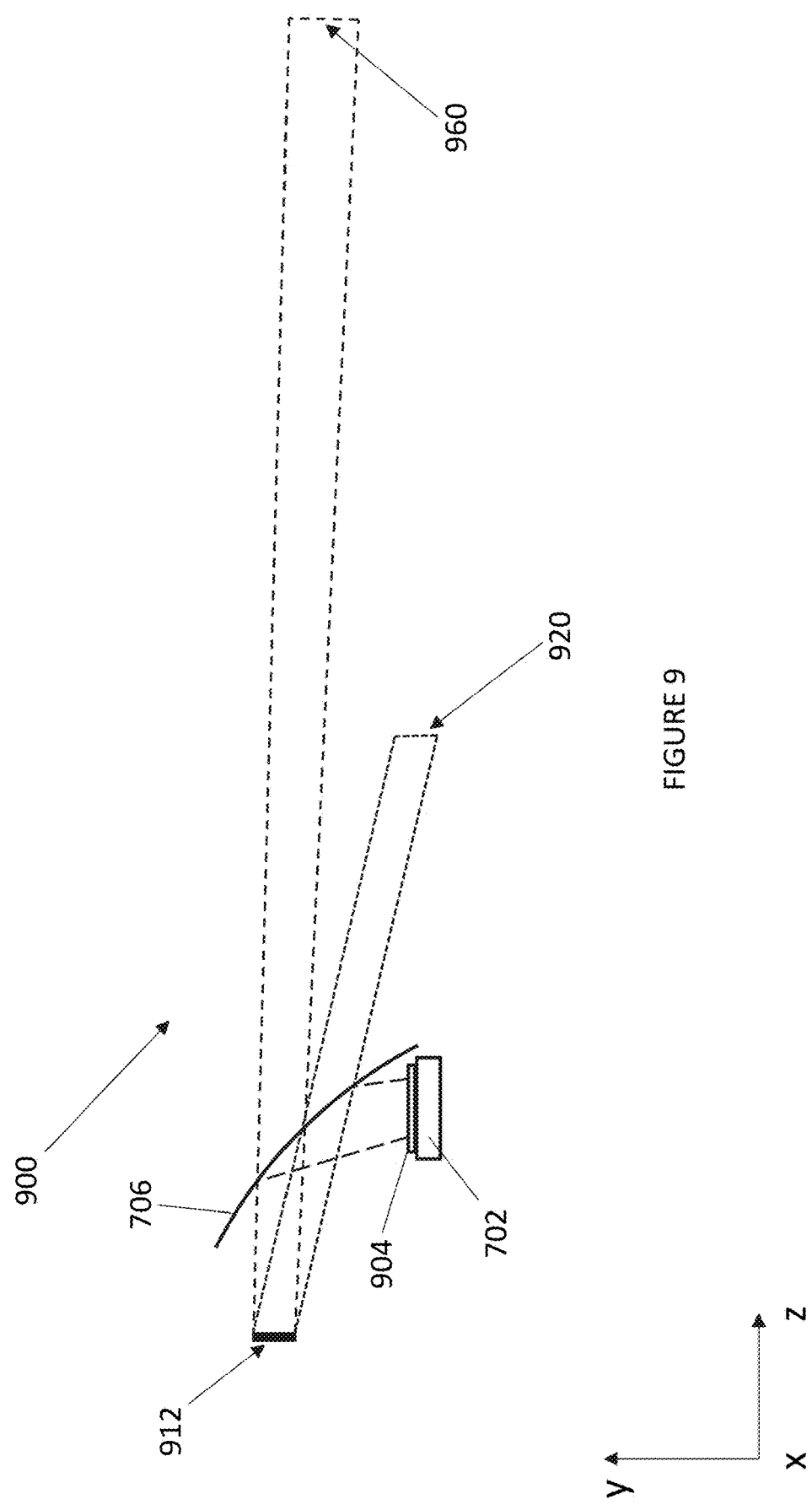
FIG. 9 is a schematic side view of a display system in accordance with the present disclosure.

FIG. 8 shows a schematic field of view 800 produced by a head-up display system 900 according to the present disclosure, which itself is schematically shown in FIG. 9. The field of view 800 has a number of virtual image points 802 each having a measurable disparity offset. These virtual image points 802 are for illustrative purposes only and have been enlarged for clarity of the description herein—in an actual field of view, the disparity offset would have a gradient change between finite virtual image points across the full length and width of the field (as opposed to the areas of the illustrative virtual image points 802 shown in FIG. 8).

The field of view 800 is visible throughout the eye-box 912 formed by the display system 900 shown in FIG. 9. The eye-box 912 is formed from replicated light (i.e. the replicas) output from waveguide 702 and reflected off the optical combiner 706, as described above in relation to FIG. 7. On the optical path of the light between the waveguide 702 and optical combiner 706 there is a corrective device 904, which provides the same functions as the corrective device 704 described above in relation to FIG. 7.

The corrective device 904 is optimised such that the disparity offset of the virtual image points decreases towards the top of the field of view 800 (i.e. the disparity offset decreases with an increase in the y-direction of the field of view 800). Meanwhile, the corrective device 904 is optimised such that the disparity offset of the virtual image points is substantially constant in the horizontal (i.e. the x-) direction of the field of view 800. That is, the difference in the disparity offset in the x-direction of the field of view 800 is small enough that a change in depth for each virtual image point at a constant y-coordinate would not be visible to the viewer.

That is, the virtual image points 802 form five groups 810, 820, 830, 840, 850, each group having virtual image points 802 at the same y-coordinate (with varying x-coordinates). The middle, or third, group 830 has a roughly neutral (i.e. zero) disparity offset, meaning that the virtual image points 802 of this group 830 will appear as if displayed at the natural focal length of the display system 900.

The virtual image points 802 of the second group 820, which have a higher y-coordinate than the virtual image points 802 of the third group 830 (i.e. are further towards the top of the field of view 800), have a lower disparity offset than the virtual image points 802 of the third group 830. That is, the virtual image points 802 of the second group 820 have a greater negative disparity offset (i.e. a disparity offset with a greater magnitude of disparity offset, but in the negative direction) than the virtual image points 802 of the third group 830. By the mechanisms described above, this makes the virtual image points 802 of the second group 820 appear as being displayed at a greater depth (i.e. further from the viewer) than the virtual image points 802 of the third group 830. Similarly, the virtual image points 802 of the first (or top) group 810, which have a higher y-coordinate than the virtual image points 802 of both the second and third groups 820, 830 (i.e. are further towards the top of the field of view 800), have a lower disparity offset than the virtual image points 802 of both the second and third groups 820, 830. That is, the virtual image points 802 of the first group 810 have a greater negative disparity offset (i.e. a disparity offset with a greater magnitude of disparity offset, but in the negative direction) than the virtual image points 802 of both the second and third groups 820, 830. By the mechanisms described above, this makes the virtual image points 802 of the first group 810 appear as being displayed at a greater depth (i.e. further from the viewer) than the virtual image points 802 of both the second and third groups 820, 830.

Meanwhile, the virtual image points 802 of the fourth group 840, which have a lower y-coordinate than the virtual image points 802 of the third group 830 (i.e. are further towards the bottom of the field of view 800), have a higher disparity offset than the virtual image points 802 of the third group 830. That is, the virtual image points 802 of the fourth group 840 have a greater positive disparity offset (i.e. a disparity offset with a greater magnitude of disparity offset in the positive direction) than the virtual image points 802 of the third group 830. By the mechanisms described above, this makes the virtual image points 802 of the fourth group 840 appear as being displayed at a lesser depth (i.e. closer to the viewer) than the virtual image points 802 of the third group 830. Similarly, the virtual image points 802 of the fifth (or bottom) group 850, which have a lower y-coordinate than the virtual image points 802 of both the third and fourth groups 830, 840 (i.e. are further towards the bottom of the field of view 800), have a higher disparity offset than the virtual image points 802 of both the third and fourth groups 830, 840. That is, the virtual image points 802 of the fifth group 850 have a greater positive disparity offset (i.e. a disparity offset with a greater magnitude of disparity offset in the positive direction) than the virtual image points 802 of both the third and fourth groups 830, 840. By the mechanisms described above, this makes the virtual image points 802 of the fifth group 850 appear as being displayed at a lesser depth (i.e. closer to the viewer) than the virtual image points 802 of both the third and fourth groups 830, 840.

In this way, the inventors have surprisingly found that different parts of the image (i.e. different groups of virtual image points) can be made to appear as if they are displayed on different planes. That is, for example, by only displaying virtual image points 802 in the first (top) and fifth (bottom) groups 810, 850, their comparative disparity offsets makes them appear to displayed on a far and near plane 960, 920 respectively. As such, the benefits of a multi-plane holographic head-up display may be achieved without the need to substantially alter the display system 900 or to substantially increase the complexity of the hologram compute.

Figure 10:
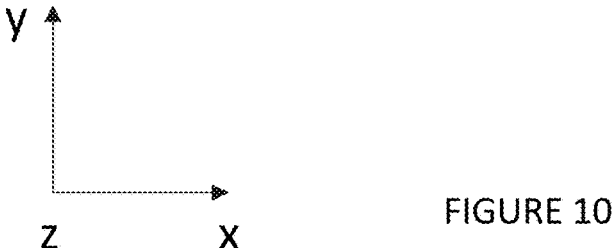
FIG. 10 is a second schematic view of a field of view produced by a display device in accordance with the present disclosure.

An example of how such a field of view could be used is shown schematically in FIG. 10. The field of view 1000 has a top section 1010, a middle section 1030 and a bottom section 1050. The top section 1010 may, for example, be formed of image points 802 in the first group 810, the middle section 1030 being formed of virtual image points 802 in the second to fourth groups 820, 830, 840 and the bottom section 1050 being formed of virtual image points 802 in the fifth group 850.

The top section 1010, appearing to be displayed on the far plane 960 (as described above), may be used to display driving environment information 1020, such as hazard warnings or directions. Meanwhile, the bottom section 1050, appearing to be displayed on the near plane 920 (as described above), may be used to display vehicle information 1060, such as speed or the remaining fuel level. The middle section 1030, which would be displayed at the natural focal length of the system (as described above), may be left blank in order to pronounce the appearance of the different planes of depths of the virtual image points displayed in the top and bottom sections 1010, 1050.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

Enumerated Embodiments

Various aspects of the disclosure are illustrated by the following enumerated embodiments, which may be combined in any number and in any combination that is not technically or logically inconsistent.

Embodiment 1. A method of head-up display in a vehicle, the method comprising:

displaying a hologram of an image on a spatial light modulator;

illuminating the displayed hologram to form spatially modulated light encoded with the hologram;

propagating the spatially modulated light to a scattering diffuser (also referred to herein as a "screen") disposed at an image reconstruction plane of the hologram such that an image reconstruction of the image (also referred to herein as a "picture") is formed on the scattering diffuser;

coupling the output of the scattering diffuser into the input port of a waveguide pupil expander (also referred to herein as a "replicator") to form a plurality of replicas of the image;

relaying the plurality of replicas of the image to an eye-box of the head-up display using the windscreen of the vehicle such that a virtual image of the image is visible from all positions of an eye-box within the vehicle; and changing a perception of depth of at least some virtual image points of the virtual image by, for each of the at least some virtual image points, changing a spatial separation between: a first line-of-sight point on the scattering diffuser corresponding to the virtual image point and a left eye position; and a second line-of-sight point on the scattering diffuser corresponding to the virtual image point and a right eye position using a corrective optic positioned between the scattering diffuser and the windscreen.

Embodiment 2. 'The method of Embodiment 1 wherein each first line-of-sight point on the scattering diffuser is identified by extrapolating a first optical path from the corresponding virtual image point to the left eye position and each second line-of-sight point on the scattering diffuser is identified by extrapolating a second optical path from the corresponding virtual image point to the right eye position.

Embodiment 3. The method of Embodiment 2 wherein the corrective optic changes the first optical path and second optical path in order to change the location of the first line-of-sight point and/or second line-of-sight point on the scattering diffuser and changes the spatial separation therebetween.

Embodiment 4. The method of any of Embodiments 1-3 wherein the change in spatial separation is a change in the horizontal separation between the first line-of-sight point and the second line-of-sight point on the scattering diffuser.

Embodiment 5. The method of any of Embodiments 1-4 wherein the perception of depth of virtual image points of a top edge of the virtual image is changed by more than that of virtual image points of the bottom edge of the virtual image such that the top edge of the virtual image appears further from the eye-box than the bottom edge of the virtual image.

Embodiment 6. The method of Embodiment 5 wherein the perception of depth increases from the bottom of the image to the top of the image.

Embodiment 7. The method of Embodiment 6, wherein the increase is linear.

Embodiment 8. The method of any of Embodiments 1-7 wherein the corrective device also changes a spatial separation of the first line-of-sight point and second line-of-sight point in the vertical direction but the change in the vertical direction is substantially uniform across the image.

Embodiment 9. The method of any of Embodiments 1-8, wherein the spatial separation corresponds to a horizontal disparity and change in spatial separation corresponds to a change in horizontal disparity.

Embodiment 10. The method of Embodiment 9, wherein the change in horizontal disparity is negative for virtual image points in a top half of the image and positive for virtual image points in a bottom half of the image.

Embodiment 11. The method of any of Embodiments 1-10, wherein the corrective optic is a bulk optic having non-uniform power that compensates for the non-uniform power of the optical combiner, wherein the non-uniform power of the bulk optic is refractive.

Embodiment 12. The method of Embodiment 11, wherein the corrective optic comprises a Fresnel structure.

Embodiment 13. The method of Embodiment 12, wherein the corrective optic has a non-complex surface or plurality of surfaces, each surface arranged at an angle relative to an output surface of the replicator, each angle at least in part corresponding to the first disparity offset function.

Embodiment 14. A head-up display for a vehicle, comprising a spatial light modulator arranged to display a holo-
gram;

a light source arranged to illuminate the displayed
hologram to form spatially modulated light encoded
with the hologram;

a scattering diffuser disposed at an image reconstruc-
tion plane of the hologram and arranged to receive
the spatially modulated light encoded with the holo-
gram such that an image reconstruction of the image
is formed on the scattering diffuser; and a waveguide pupil expander having an input port
arranged to receive from the scattering diffuser an
output of light of the image construction of the
image, the waveguide pupil expander being arranged
to form a plurality of replicas of the image, wherein a windscreen of the vehicle is arranged to relay-
ing the plurality of replicas of the image to an eye-box
of the head-up display using the windscreen of the
vehicle such that a virtual image of the image is visible
from all positions of an eye-box within the vehicle; and wherein the head-up display further comprises a correc-
tive optic positioned between the scattering diffuser and
the windscreen, the corrective optic being configured to
change a perception of depth of at least some virtual
image points of the virtual image by, for each of the at
least some virtual image points, changing a spatial
separation between: a first line-of-sight point on the
scattering diffuser corresponding to the virtual image
point and a left eye position; and a second line-of-sight
point on the scattering diffuser corresponding to the
virtual image point and a right eye position using a
corrective optic positioned between the scattering dif-
fuser and the windscreen.

Embodiment 15. The head-up display of Embodiment 14,
wherein the corrective optic is a bulk optic having
non-uniform power that compensates for the non-uni-
form power of the optical combiner, wherein the non-
uniform power of the bulk optic is refractive.

Embodiment 16. The head-up display of Embodiment 15,
wherein the corrective optic comprises a Fresnel struc-
ture.

Embodiment 17. The head-up display of any of Embodi-
ments 14-16, wherein the corrective optic is arranged to
change the first optical path and second optical path in
order to change the location of the first line-of-sight
point and/or second line-of-sight point on the scattering
diffuser and changes the spatial separation therebe-
tween, each first line of sight point on the scattering
diffuser being identified by extrapolating a first optical
path from the corresponding virtual image point to the
left eye position, each second line-of-sight point on the
scattering diffuser being identified by extrapolating a
second optical path from the corresponding virtual
image point to the right eye position.

Embodiment 18. The head-up display of any of Embodi-
ments 14-17, wherein the corrective device is further
configured to change a spatial separation of the first
line-of-sight point and second line-of-sight point in the
vertical direction but the change in the vertical direc-
tion is substantially uniform across the image.

Embodiment 19. The head-up display of any of Embodi-
ments 14-18, wherein the spatial separation corre-
sponds to a horizontal disparity and change in spatial
separation corresponds to a change in horizontal dis-
parity.

Embodiment 20. The head-up display of any of Embodi-
ments 14-19, arranged such that the perception of depth of virtual image points of a top edge of the virtual
image is changed by more than that of virtual image
points of the bottom edge of the virtual image such that
the top edge of the virtual image appears further from
the eye-box than the bottom edge of the virtual image.

It will be apparent to those skilled in the art that various
modifications and variations can be made without departing
from the scope of the appended claims. The present disclo-
sure covers all modifications and variations within the scope
of the appended claims and their equivalents.

What is claimed is:

1. A method of head-up display in a vehicle having a
windscreen, the method comprising:

displaying a hologram of an image on a spatial light
modulator;

illuminating the displayed hologram to form spatially
modulated light encoded with the hologram;

propagating the spatially modulated light to a scattering
diffuser disposed at an image reconstruction plane of
the hologram such that an image reconstruction of the
image is formed on the scattering diffuser;

coupling the output of the scattering diffuser into the input
port of a waveguide pupil expander to form a plurality
of replicas of the image;

relaying the plurality of replicas of the image to an
eye-box of the head-up display using the windscreen of
the vehicle such that a virtual image of the image is
visible from all positions of an eye-box within the
vehicle; and changing a perception of depth of at least some virtual
image points of the virtual image by, for each of the at
least some virtual image points, changing a spatial
separation between: a first line-of-sight point on the
scattering diffuser corresponding to the virtual image
point and a left eye position; and a second line-of-sight
point on the scattering diffuser corresponding to the
virtual image point and a right eye position using a
corrective optic positioned between the scattering dif-
fuser and the windscreen.

2. The method of claim 1, wherein each first line-of-sight
point on the scattering diffuser is identified by extrapolating
a first optical path from the corresponding virtual image
point to the left eye position and each second line-of-sight
point on the scattering diffuser is identified by extrapolating
a second optical path from the corresponding virtual image
point to the right eye position.

3. The method of claim 2, wherein the corrective optic
changes the first optical path and second optical path in order
to change the location of the first line-of-sight point and/or
second line-of-sight point on the scattering diffuser and
changes the spatial separation therebetween.

4. The method of claim 1, wherein the change in spatial
separation is a change in the horizontal separation between
the first line-of-sight point and the second line-of-sight point
on the scattering diffuser.

5. The method of claim 1, wherein the perception of depth
of virtual image points of a top edge of the virtual image is
changed by more than that of virtual image points of a
bottom edge of the virtual image such that the top edge of
the virtual image appears further from the eye-box than the
bottom edge of the virtual image.

6. The method of claim 5, wherein the perception of depth
increases from the bottom of the image to the top of the
image.

7. The method of claim 6, wherein the increase is linear.

8. The method of claim 1, wherein the corrective optic
also changes a spatial separation of the first line-of-sight point and second line-of-sight point in the vertical direction but the change in the vertical direction is substantially uniform across the image.

9. The method of claim 1, wherein the spatial separation corresponds to a horizontal disparity and change in spatial separation corresponds to a change in horizontal disparity.

10. The method of claim 9, wherein the change in horizontal disparity is negative for virtual image points in a top half of the image and positive for virtual image points in a bottom half of the image.

11. The method of claim 1, wherein the corrective optic is a bulk optic having non-uniform power that compensates for a non-uniform power of the windscreen, wherein the non-uniform power of the bulk optic is refractive.

12. The method of claim 11, wherein the corrective optic comprises a Fresnel structure.

13. The method of claim 12, wherein the corrective optic has a non-complex surface or plurality of surfaces, each surface arranged at an angle relative to an output surface of the waveguide pupil expander, each angle at least in part corresponding to a first disparity offset function.

14. A head-up display for a vehicle, comprising
a spatial light modulator arranged to display a hologram;
a light source arranged to illuminate the displayed hologram to form spatially modulated light encoded with the hologram;
a scattering diffuser disposed at an image reconstruction plane of the hologram and arranged to receive the spatially modulated light encoded with the hologram such that an image reconstruction of an image is formed on the scattering diffuser; and
a waveguide pupil expander having an input port arranged to receive from the scattering diffuser an output of light of the image construction of the image, the waveguide pupil expander being arranged to form a plurality of replicas of the image,
wherein a windscreen of the vehicle is arranged to relay the plurality of replicas of the image to an eye-box of the head-up display using the windscreen of the vehicle such that a virtual image of the image is visible from all positions of an eye-box within the vehicle; and
wherein the head-up display further comprises a corrective optic positioned between the scattering diffuser and the windscreen, the corrective optic being configured to change a perception of depth of at least some virtual image points of the virtual image by, for each of the at least some virtual image points, changing a spatial separation between: a first line-of-sight point on the scattering diffuser corresponding to the virtual image point and a left eye position; and a second line-of-sight point on the scattering diffuser corresponding to the virtual image point and a right eye position using a corrective optic positioned between the scattering diffuser and the windscreen,
wherein each first line-of-sight point on the scattering diffuser is identified by extrapolating a first optical path from the corresponding virtual image point to the left eye position and each second line-of-sight point on the scattering diffuser is identified by extrapolating a second optical path from the corresponding virtual image point to the right eye position, and
wherein the corrective optic is arranged to change the first optical path and the second optical path in order to change the location of the first line-of-sight point and/or second line-of-sight point on the scattering diffuser and changes the spatial separation therebetween.

15. The head-up display of claim 14, wherein the corrective optic is a bulk optic having non-uniform power that compensates for the non-uniform power of the windscreen, wherein the non-uniform power of the bulk optic is refractive.

16. The head-up display of claim 15, wherein the corrective optic comprises a Fresnel structure.

17. The head-up display of claim 16, wherein the corrective optic has a non-complex surface or plurality of surfaces, each surface arranged at an angle relative to an output surface of the waveguide pupil expander, each angle at least in part corresponding to a first disparity offset function.

18. The head-up display of claim 14, wherein the corrective optic is further configured to change a spatial separation of the first line-of-sight point and second line-of-sight point in the vertical direction, wherein the change in the vertical direction is substantially uniform across the image.

19. A head-up display for a vehicle, comprising
a spatial light modulator arranged to display a hologram;
a light source arranged to illuminate the displayed hologram to form spatially modulated light encoded with the hologram;
a scattering diffuser disposed at an image reconstruction plane of the hologram and arranged to receive the spatially modulated light encoded with the hologram such that an image reconstruction of an image is formed on the scattering diffuser; and
a waveguide pupil expander having an input port arranged to receive from the scattering diffuser an output of light of the image construction of the image, the waveguide pupil expander being arranged to form a plurality of replicas of the image,
wherein a windscreen of the vehicle is arranged to relay the plurality of replicas of the image to an eye-box of the head-up display using the windscreen of the vehicle such that a virtual image of the image is visible from all positions of an eye-box within the vehicle,
wherein the head-up display further comprises a corrective optic positioned between the scattering diffuser and the windscreen, the corrective optic being configured to change a perception of depth of at least some virtual image points of the virtual image by, for each of the at least some virtual image points, changing a spatial separation between: a first line-of-sight point on the scattering diffuser corresponding to the virtual image point and a left eye position; and a second line-of-sight point on the scattering diffuser corresponding to the virtual image point and a right eye position using a corrective optic positioned between the scattering diffuser and the windscreen, and
wherein the spatial separation corresponds to a horizontal disparity and change in spatial separation corresponds to a change in horizontal disparity.

20. A head-up display for a vehicle, comprising
a spatial light modulator arranged to display a hologram;
a light source arranged to illuminate the displayed hologram to form spatially modulated light encoded with the hologram;
a scattering diffuser disposed at an image reconstruction plane of the hologram and arranged to receive the spatially modulated light encoded with the hologram such that an image reconstruction of an image is formed on the scattering diffuser; and
a waveguide pupil expander having an input port arranged to receive from the scattering diffuser an output of light of the image construction of the image, the waveguide pupil expander being arranged to form a plurality of replicas of the image, wherein a windscreen of the vehicle is arranged to relay the plurality of replicas of the image to an eye-box of the head-up display using the windscreen of the vehicle such that a virtual image of the image is visible from all positions of an eye-box within the vehicle, wherein the head-up display further comprises a corrective optic positioned between the scattering diffuser and the windscreen, the corrective optic being configured to change a perception of depth of at least some virtual image points of the virtual image by, for each of the at least some virtual image points, changing a spatial separation between: a first line-of-sight point on the scattering diffuser corresponding to the virtual image point and a left eye position; and a second line-of-sight point on the scattering diffuser corresponding to the virtual image point and a right eye position using a corrective optic positioned between the scattering diffuser and the windscreen, and wherein the head-up display is arranged such that the perception of depth of virtual image points of a top edge of the virtual image is changed by more than that of virtual image points of a bottom edge of the virtual image such that the top edge of the virtual image appears further from the eye-box than the bottom edge of the virtual image.

\* \* \* \* \*